United States Patent
Märkl

(10) Patent No.: US 9,011,285 B2
(45) Date of Patent: Apr. 21, 2015

(54) DRIVE ARRANGEMENT

(75) Inventor: Johann Märkl, Neuburg a.d. Donau (DE)

(73) Assignee: Audi AG, Ingolstadt (DE)

( * ) Notice: Subject to any disclaimer, the term of this patent is extended or adjusted under 35 U.S.C. 154(b) by 156 days.

(21) Appl. No.: 13/463,903

(22) Filed: May 4, 2012

(65) Prior Publication Data

US 2013/0123057 A1 May 16, 2013

(30) Foreign Application Priority Data

May 6, 2011 (DE) .......................... 10 2011 100 817

(51) Int. Cl.
*B60K 1/00* (2006.01)
*B60K 17/16* (2006.01)

(52) U.S. Cl.
CPC . *B60K 17/16* (2013.01); *B60K 1/00* (2013.01); *B60K 2001/001* (2013.01)

(58) Field of Classification Search
USPC ......................................................... 475/150
See application file for complete search history.

(56) References Cited

U.S. PATENT DOCUMENTS

| | | | | |
|---|---|---|---|---|
| 2,450,290 | A | * | 9/1948 | Maxwell .......................... 310/83 |
| 5,637,048 | A | * | 6/1997 | Maeda et al. .................. 475/150 |
| 5,759,128 | A | * | 6/1998 | Mizutani et al. ............... 475/149 |
| 6,059,684 | A | * | 5/2000 | Sasaki et al. ................... 475/206 |
| 7,316,627 | B2 | * | 1/2008 | Bennett .......................... 475/149 |
| 2003/0196842 | A1 | * | 10/2003 | Hashimoto ................... 180/65.1 |
| 2008/0058149 | A1 | | 3/2008 | Yang |
| 2011/0094806 | A1 | * | 4/2011 | Mack et al. ................... 180/65.6 |
| 2012/0129644 | A1 | * | 5/2012 | Palfai et al. ................... 475/150 |
| 2012/0210816 | A1 | * | 8/2012 | Izumi ......................... 74/490.03 |

FOREIGN PATENT DOCUMENTS

| | | |
|---|---|---|
| CN | 101519040 | 12/2012 |
| DE | 40 10 742 | 6/1991 |
| DE | 44 33 100 | 4/1996 |
| DE | 196 24 288 | 1/1998 |
| DE | 10 2009 006 424 A1 | 5/2000 |
| DE | 29 820 349 U1 | 7/2010 |
| EP | 1 000 829 | 5/2000 |
| JP | 2010-168035 | 8/2010 |

OTHER PUBLICATIONS

Chinese Search Report.

* cited by examiner

*Primary Examiner* — Gene Crawford
*Assistant Examiner* — Ryan Dodd
(74) *Attorney, Agent, or Firm* — Henry M. Feiereisen LLC

(57) ABSTRACT

In a drive arrangement for wheels of a motor vehicle which are driven by means of an electric machine via a differential, the electric machine includes a rotor and a stator and drives a drive element of the differential whose output shafts output to the wheels of the motor vehicle. In order to achieve a structurally compact construction which enables favorable transmission ratios the rotor outputs to the drive element of the differential and that by interposing a gear mechanism, the drive element and/or the output shafts are supported offset to the rotation axis of the rotor.

3 Claims, 4 Drawing Sheets

DRIVE ARRANGEMENT

CROSS-REFERENCES TO RELATED APPLICATIONS

This application claims the priority of German Patent Application, Serial No. 10 2011 100 817.2, filed May 6, 2011, pursuant to 35 U.S.C. 119(a)-(d), the disclosure of which is incorporated herein by reference.

BACKGROUND OF THE INVENTION

The present invention relates to a drive arrangement for wheels of a motor vehicle.

The following discussion of related art is provided to assist the reader in understanding the advantages of the invention, and is not to be construed as an admission that this related art is prior art to this invention.

In electrically driven motor vehicles or hybrid drives, it is know to drive an axle of the motor vehicle by means of an electromotor or an electric machine (also shiftable to function as generator during braking) via a customary differential. If the electric machine is to have a high torque or respectively a high driving power, the accommodation in the motor vehicle can pose problems.

It would be desirable and advantageous to provide an improved drive arrangement with which relatively large size electric motors or electric machines can be built in a structurally favorable manner and with higher constructive degrees of freedom

SUMMARY OF THE INVENTION

According to one aspect of the present invention a drive arrangement for wheels of a motor vehicle can include a differential having a drive element and output shafts, wherein the output shafts are operably connected to the wheels of the motor vehicle, an electric machine having a rotor defining a rotation axis and connected in driving relationship with the drive element of the differential, and a gear mechanism, wherein the drive element and/or the output shafts are supported at an offset relative to the rotation axis of the rotor through interposition of the gear mechanism. Shifting of the rotation axis of the electric machine relative to the rotation axis of the differential allows building the electric machine large in size without for example impairing the ground clearance in the region of the differential; the electric machine can, however, also be arranged toward the front or the rear or combined obliquely. Further, the gear mechanism allows to favorably influence the overall transmission ratio electric machine : differential output (flange shafts) at structurally favorable dimensions.

According to another advantageous feature of the invention, the hollow drive shaft of the rotor can carry a pinion, which meshes with an internally toothed internal gear and is connected to the drive element of the differential, wherein at least one of the output shafts or respectively, flange shafts of the differential extends through the hollow shaft. This results in a compact and with regard to manufacturing favorable arrangement.

The differential with the drive element and the internally toothed internal gear can advantageously be mounted on a side of the electric machine, wherein one of the output shafts or respectively flange shafts in the reverse drive is guided through the hollow drive shaft of the electric machine. In contrast to this, the differential can also be arranged on one side of the electric machine and the drive pinion with the internal gear on the other side of the electric machine, wherein the shaft which connects the internal gear to the drive element of the differential is then to be configured as hollow shaft, which would have to be arranged axially parallel to the output shaft.

According to another advantageous feature of the invention, the differential can be supported coaxial to the rotor of the electric machine and output to the offset supported flange shafts via intermediate shafts and two gear mechanisms. Instead of the one gear mechanism two gear mechanisms can be provided which are arranged downstream of the differential with regard to the force flux, and which then output to the output shafts or respectively the flange shafts.

In a particularly advantageous and with respect to installation space favorable layout, the differential can be arranged inside the hollow shaft of the rotor, while the two gear mechanisms are positioned on both sides outside of the electric machine. The two gear mechanisms can in turn be formed by pinions on the intermediate shafts and by internally toothed internal gears on the output shafts or respectively, flange shafts.

In a further advantageous embodiment of the invention, the rotor of the electric machine can output to the drive element of the differential via a first gear mechanism and the output elements of the differential can output to the offset output shafts or respectively flange shafts via intermediate shafts and second gear mechanisms. This achieves to further increase the overall transmission ratio between the electric machine and output to the output shafts or respectively, flange shafts or respectively the driven wheels of the motor vehicle at a structurally particularly compact construction which allows realizing high drive torques at adequate dimensions of the electric machine.

Advantageously, the first gear mechanism can be shiftable via a shifting device into a driveless neutral position or into at least one transmission stage. This enables further degrees of freedom in the transmission layout of the drive arrangement at a small additional effort and a simple transmission-technical shut down of the electric machine in the neutral position of the switching device.

Particularly preferably, the first gear mechanism can be a planet gear train with a housing-fixed element, a driven element and a driving element, wherein via the shifting device, the housing-fixed element can be shifted to be housing-fixed, shifted to be freely rotatable, or coupled to the outputting element. With this, the neutral position and two transmission stages are shiftable in a structurally simple and compact construction.

In a preferred constructive layout, the element which can be shifted to be housing-fixed can be the sun gear of the planet gear train, which carries a shifting gear system which interacts with a control sleeve which is actuated via an actuator, wherein the control sleeve is further coupleable to a housing-fixed gear system on one hand and a gear system which is formed on the outputting element on the other hand. Further, the driving element of the planet gear train can be the internal gear which is connected to the hollow shaft of the electric machine and the outputting element of the planet carrier.

In an alternative, constructively simpler embodiment, the first gear mechanism between the electric machine and the drive element of the differential can be a non shiftable planet gear train with housing-fixed elements and an outputting element. Such planet gear trains have a particularly short axial dimension and allow transmission of high torques at a manufacturing-wise small effort.

The internal gear of the planet gear train or the sun gear can be connected to the rotor of the electric machine in a rotationally fixed manner at different definable transmission ratios, the sun gear or the internal gear can be arranged housing-fixed and finally the planet carrier can be drivingly coupled to the drive element of the differential.

The second gear mechanisms between the intermediate shafts of the differential and the output shafts can be formed by spur gears which mesh with one another or by pinions which are provided on the intermediate shafts and by internal gears which are arranged on the output shafts which are arranged offset to the pinions.

Finally, in order to achieve a structurally compact and mounting wise favorable construction the electric machine and the differential can be mounted in a common axle housing together with the output shafts and optionally with the intermediate shafts and the at least one gear mechanism.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
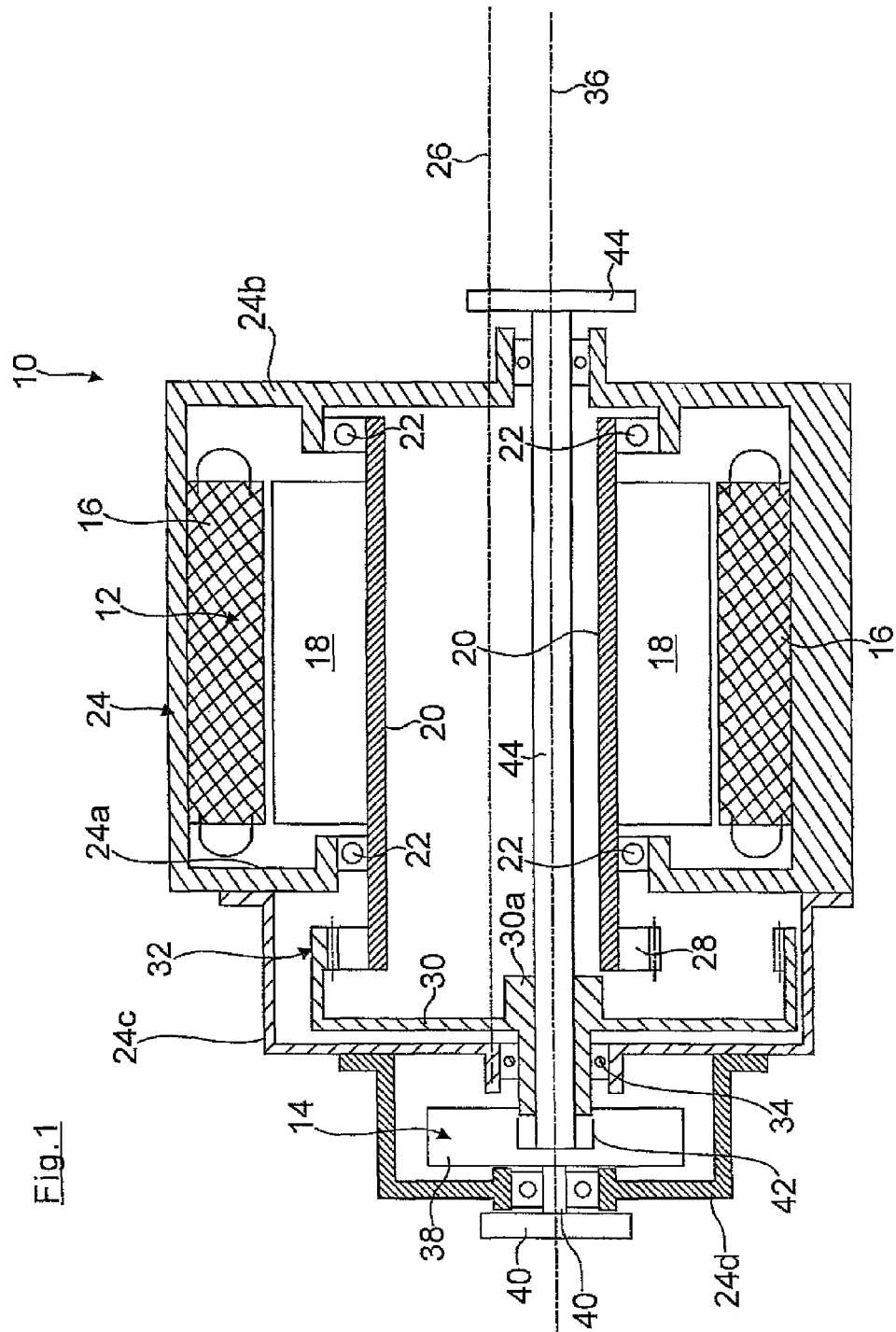
FIG. 1 shows a schematic illustration of a first drive arrangement with an electric machine, which outputs to a laterally mounted differential via a gear mechanism, wherein the rotation axis of the electric machine is offset to the rotation axis of the differential.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a first drive arrangement for an electrically driven axle (for example a front axle or rear axle) of a motor vehicle designated 10, which is substantially formed by an electric machine 12 and a differential 14.

The driving electric machine 12, which can be operated during braking or coasting of the motor vehicle as a generator, has a ring-shaped stator 16 and a ring shaped rotor 18 which is arranged on a hollow drive shaft 20. The hollow drive shaft 20 is mounted in housing walls 24a, 24b of an axle housing 24 for rotation about a first rotation axis via rolling bearings 22, which rotation axis thus defines the "center" of the electric machine 12.

Further, the hollow drive shaft 20 carries a pinion 28 which together with an internally toothed pot shaped internal gear 30 forms a gear mechanism 32 which increases the torque of the electric machine 12.

The hub 30a of the internal gear 30 is rotatably supported via a rolling bearing 3 in the housing cover 24c which is flanged to the housing 24 or to the housing wall 24a thereof, wherein the internal gear 30 defines a rotation axis 36 which is offset to the rotation axis 26 of the rotor 20, for example in construction position downward.

The differential 14 is for example configured as a planet gear train which is known per se and is therefore not further described. The differential 14 is arranged in a further housing cover 24d which is bolted to the housing cover 24c. The drive element of the differential 14 is the planet carrier (not shown) which is drivingly connected to the hub 30a of the internal gear 30.

The outer gear 38 as the one output element is drivingly connected to a first flange shaft 40 and the sun gear 42 as second output element is drivingly connected to the flange shaft 44 of the differential 14. The flange shaft which is rotatably supported in the hub 30a and via a rolling bearing 46 in the housing wall 24b extends in the reverse drive through the hollow drive shaft 20 of the rotor 18.

The flange shafts 40, 44 are connected to the driven wheels of the motor vehicle via cardan shafts in a manner which is not shown.

The offset of the rotation axes 26 of the electric machine 12 and the differential 14 with the flange shafts 40, 42 is here determined by the inner diameter of the hollow drive shaft 20 and the outer diameter of the backward guided flange shaft 44 which should run freely.

The transmission ratio between the electric machine 12 and the differential 14 can be defined by the configuration of the gear mechanism 32. Via the differential 14 an adjustment of the rotational speed of the driven wheels of the motor vehicle is realized for example when negotiating curves.

Figure 2:
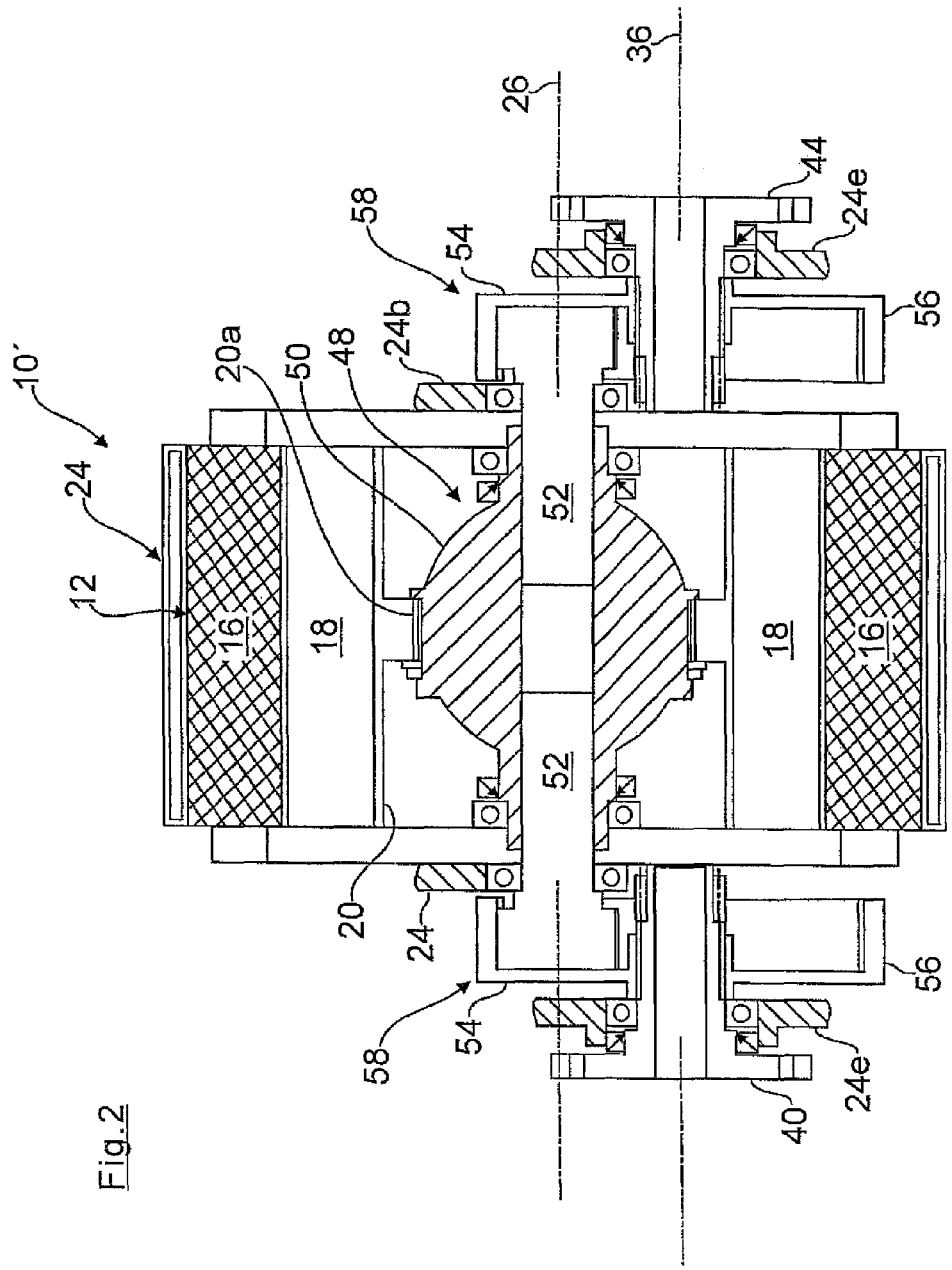
FIG. 2 shows a schematic illustration of a second drive arrangement with an electric machine and a differential which is integrated in the rotor of the electric machine, which differential outputs to radially offset flange shafts via coaxial intermediate shafts and lateral gear mechanisms.

FIG. 2 shows a second alternative drive device 10', which however is only described insofar as it significantly differs from the drive device 10 according to FIG. 1. Functionally equivalent parts are provided with same reference signs. The housing 24 is only shown partially, however it can be configured essentially similar to FIG. 3 which is explained below.

Different to FIG. 1, the differential 48 is configured as bevel gear differential, whose differential case 50 is integrated with coaxial rotation axis in the hollow drive shaft 20 of the electric machine 12. The hollow drive shaft 20 is provided with an internal spline 20, which in circumferential direction form fittingly interacts with a corresponding outer spline on the differential case 50.

The axle bevel gears (not visible, compare FIG. 3) of the differential 48 output to intermediate shafts 52, which are rotatably supported in the housing walls 24a, 24b which are only shown as outline and which carry pinions 54 on both sides, which pinions 54 in connection with pot-shaped internal gears 56 form two laterally arranged gear mechanisms 58.

The internal gears 56 are drivingly and fixedly connected to the flange shafts 40, 44 which are supported in outer housing covers 24e and define a rotation axis 36 which extends offset (here for example downward) to the rotation axis 26.

As can be readily seen from FIG. 2, the gear mechanism according to FIG. 1 is here divided into two gear mechanisms 58, which are positioned downstream of the differential 48 with regard to the force flux and on both sides of the electric machine 12. Since the flange shaft 44 of FIG. 1 does thus not have to be guided through the hollow drive shaft 20 of the rotor 18, the offset between the rotation axes 26, 36 can be chosen larger than in the embodiment according to FIG. 1 if needed.

Figure 3:
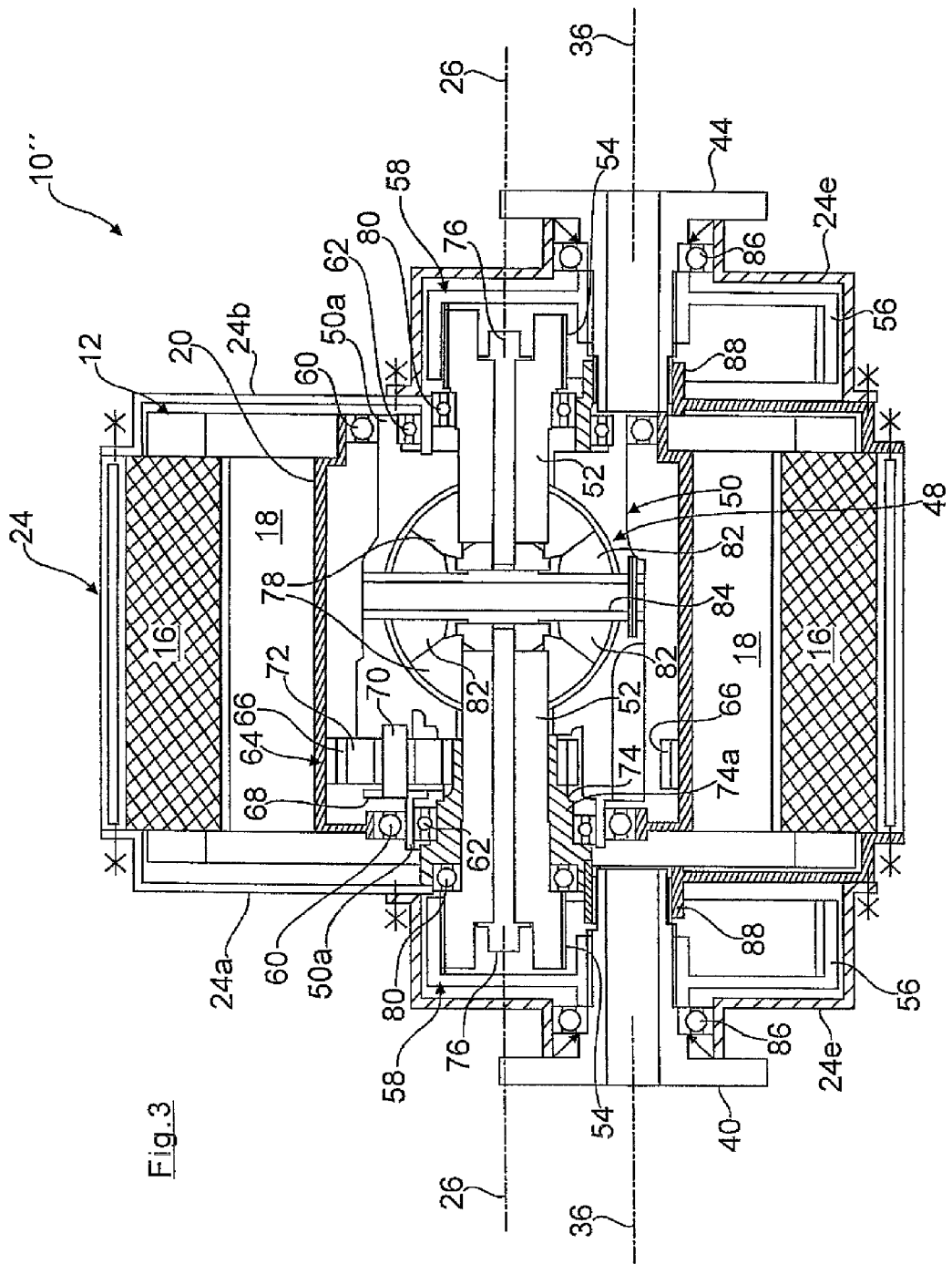
FIG. 3 shows a schematic illustration of a third drive arrangement with a first gear mechanism between the rotor of the electric machine and the differential and second gear mechanisms between the intermediate shafts and the radially offset flange shafts.

FIG. 3 shows a third alternative embodiment of the drive arrangement 10" in more detail. Functionally equivalent parts are again provided with same reference signs.

Again, the bevel gear differential 48 is integrated coaxial relative to the rotor in the hollow drive shaft 20 of the latter wherein the hollow drive shaft 20 is rotatably supported on bearing necks 50a of the differential case via rolling bearings 60, and the bearing necks 50a are rotatably supported on bearing collars of the head side housing walls 24a, 24b via further rolling bearings 62. With regard to the housing wall 24a it is noted that in the shown example, the latter transitions into a hub section 74a, which is further explained below.

The rotor 18 or respectively, its hollow drive shaft 20 drives the drive element or respectively, the differential case 50 of the differential 48 via a first gear mechanism 64.

The gear mechanism 64 has a internal gear 66, which has an internal toothing and is fixedly connected to the hollow drive shaft 20, a planet gear wheel carrier 68 integrated into the differential case and having planet gears 72 which are supported on axes 70 (only one planet gear is visible), and finally a sun gear 74 which is fixedly connected to the housing wall 24a.

The hub section 74a of the sun gear 74 forms the bearing collar for the mentioned rolling bearing 62 and at the same time the sliding bearing of the one intermediate shaft 52, here on the left.

The intermediate shafts 52 are fixedly bolted to the axle bevel gears 78 of the differential 48 and rotatably supported in the housing walls 24a, 24b or respectively, the hub section 74a of the housing-fixed sun gear 74 via rolling bearings 80. The axle bevel gears 78 mesh with the planet bevel gears 82, which are rotatably supported on engagement pin 84.

As previously described in FIG. 2, the intermediate shafts 52 further carry pinions 54 which together with the internal gears 56 on the flange shafts 40, 44 form the gear mechanisms 58 on both sides.

The flange shafts 40, 44 are rotatably supported in bearing collars of the housing walls 24a, 24b and in the housing covers 24e via rolling bearings 86, 88, wherein the rotation axis of the flange shafts is again correspondingly offset downwards.

Through the gear mechanism 64 which is situated upstream of the differential 48 with regard to the force flux and the two gear mechanisms 58 which are situated downstream of the differential with regard to the force flux, an overall transmission ratio of for example 5 between the rotor 18 of the driving electric machine 12 and the outputting flange shafts 40, 44 can be designed at a structurally and constructively favorable layout.

Figure 4:
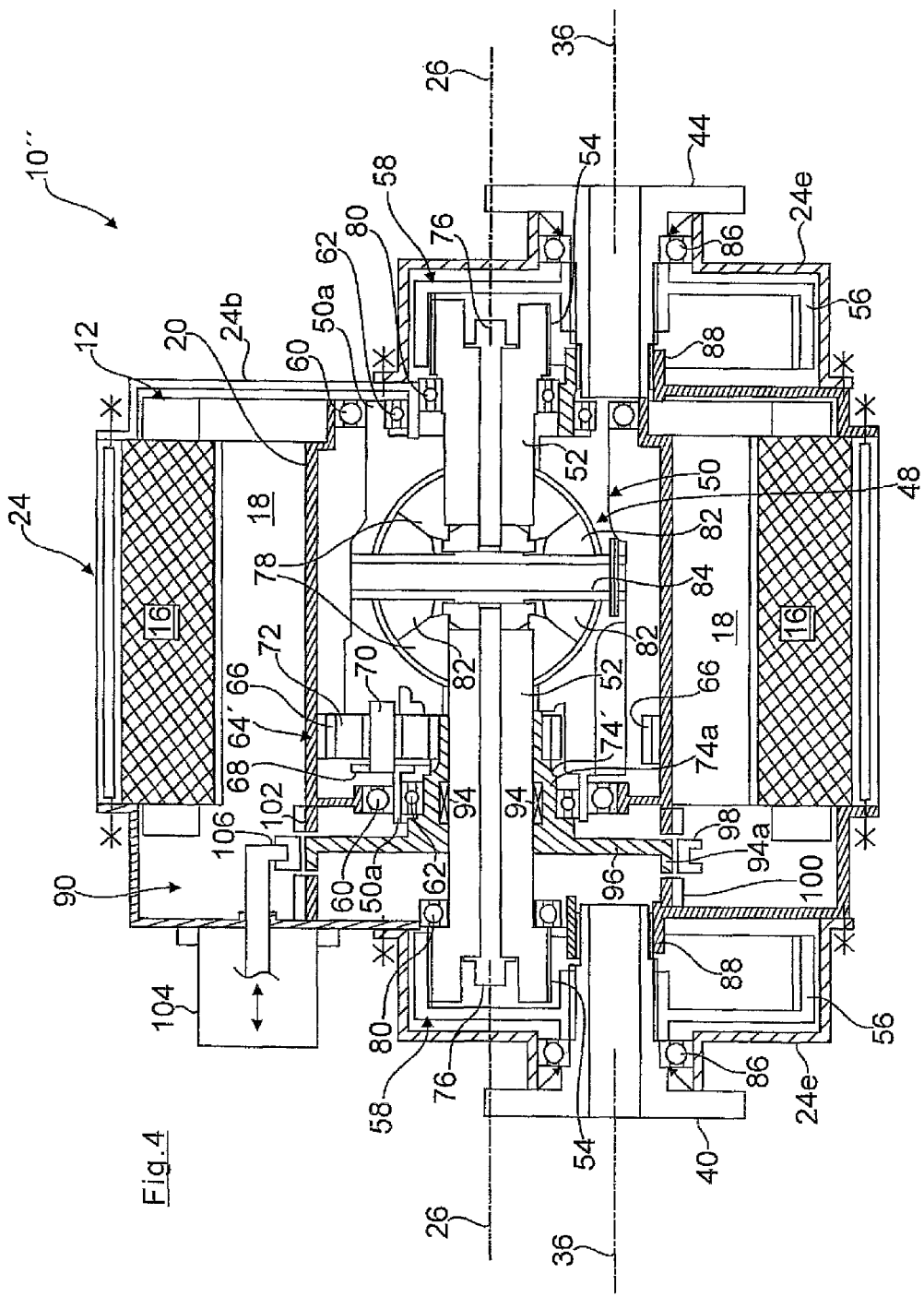
FIG. 4 shows a schematic illustration of a modification of the drive arrangement of FIG. 3 in which the first gear mechanism between the rotor of the electric machine and the differential is shiftable into a neutral position and into two transmission stages via a shifting device.

A further transmission layout is achieved with the drive arrangement 10''' according to FIG. 4, in which the first gear mechanism 64' is configured shiftable. The drive arrangement 10''' is only described insofar as it significantly differs from FIG. 3. Functionally similar parts are provided with same reference signs.

In contrast to FIG. 3, the sun gear 74' of the planet gear train 64' which is shiftable via a shifting device 90 is not supported fixed to the housing but rotatably on the left intermediate shaft 52.

The sun gear 74' further carries a shifting gear 96 with an outer shifting tooth system 94a, on which a control sleeve 98 with a corresponding internal tooth system is shiftably arranged.

The control sleeve 98 interacts with a housing-fixed shifting gear system 110 and with a shifting gear system 102 on the internal gear 66 of the hollow shaft 20 which carries the planet gear train 64.

The control sleeve 98 is shiftable via a shift fork 106 from the drawn neutral position—in which the sun gear 74' is freely rotatable—towards the left onto the shifting gear system 100 which is fixed to the housing or to the right onto the shifting gear system 102 of the hollow shaft 20.

In the neutral position of the shifting device 90, the sun gear 74' is freely rotatable and with this the electric machine 12 decoupled from the differential 64' or respectively from the entire output.

When the sun gear 74' is shifted to be fixed to the housing according to FIG. 3 a defined first transmission stage is established.

In the right shifting position of the shifting device 90, the sun gear 74' is coupled to the hollow shaft 20 or respectively the internal gear 66, whereby the planet gear train 64' is blocked in itself or respectively a second transmission stage 1:1 is established. The remaining function of the drive arrangement 10''' corresponds to the drive arrangement 10" of FIG. 3.

The differential 14 according to FIG. 1 can also be a bevel gear differential as in FIGS. 2, 3 and 4 and contrariwise the bevel gear differential can be a differential of a different design.

For achieving a different transmission ration, the gear mechanism 64 can also be configured such the rotor 18 or respectively its hollow drive shaft 20 outputs to the sun gear 74 which in this instant is rotatably supported, while the internally toothed internal gear 66 is arranged fixed to the housing Instead of the gear mechanisms 58 with an internal gear 56 the latter can also be configured as spur gear drives, wherein then the pinion 54 would mesh with a further spur gear on the flange shafts 40, 44. Likewise, the switching device can be configured in a different manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A drive arrangement for wheels of a motor vehicle, comprising:
a differential having a drive element and output shafts, said output shafts being each operably connected to a respective one of the wheels of the motor vehicle;
an electric machine having a rotor defining a rotation axis and connected in driving relationship with the drive element of the differential; and
a gear mechanism, wherein the drive element and/or the output shafts are supported at an offset relative to the rotation axis of the rotor through interposition of the gear mechanism, wherein the gear mechanism includes an internal gear which is connected with the drive element of the differential, and a pinion which meshes with the internal gear, said rotor having a hollow drive shaft which supports the pinion, with at least one of the output shafts extending through the hollow drive shaft.

2. The drive arrangement of claim 1, wherein the differential and the internal gear of the gear mechanism are mounted on a side of the electric machine, with one of the output shafts being guided in reverse drive through the hollow drive shaft.

3. The drive arrangement of the claim 1, further comprising a common axle housing to accommodate the electric machine, the differential, the output shafts, and the gear mechanism.

* * * * *